UNITED STATES PATENT OFFICE.

EDWARD GEORGE RIVERS, OF RICHMOND, ENGLAND, ASSIGNOR OF ONE-HALF TO THE ELECTRIC AND ORDNANCE ACCESSORIES COMPANY LIMITED, OF BIRMINGHAM, ENGLAND.

PROCESS OF PREPARING CARBON FOR ELECTRICAL RESISTANCES.

No. 841,572.  Specification of Letters Patent.  Patented Jan. 15, 1907.

Application filed December 22, 1905. Serial No. 293,039.

*To all whom it may concern:*

Be it known that I, EDWARD GEORGE RIVERS, civil engineer, a subject of the King of Great Britain, residing at Beverley Lodge, Richmond, in the county of Surrey, England, have invented a certain new and useful Process of Preparing Carbon for Electrical Resistances and the Like, of which the following is a specification.

This invention has reference to a process or method of preparing or treating carbon for use in the formation of electrical resistances and heater elements and as a paste for mounting and jointing electrical conductors for joining up platinum wires with carbon filaments in the manufacture of incandescent electric lamps and for analogous uses.

Hitherto it has been proposed to utilize as the resistance material in the elements of electrical radiators and heaters finely ground, powdered, or deposited carbon inclosed between plates or concentric tubes of enameled iron; but the carbon applied or used in this form has not been commercially successful, principally by reason of the cost of production and the difficulty of insuring the permanence of initial tests as to current consumption.

According to the present invention these difficulties are obviated, a material of high resistance efficiency is obtained without otherwise affecting its conductivity, and the utilization of the resistance material in the manufacture of electrical radiator and heater elements is facilitated for electrical jointing and similar purposes by a process or method of treatment which consists, broadly, in reassembling or reconversion of the finely-powdered carbon into a solid body of high resistance by first forming the said carbon into a paste with some alkaline silicious agglutinate, such as a solution or soluble silica or waterglass, and then subjecting the mixture to a high temperature, and also, in cases where extreme hardness is required, to the subsequent action of a solution of carbonic acid or other weak acid which will act upon and decompose the silicate.

In carrying out the invention in its application to the manufacture of the resistance elements of electrical radiators and other purposes finely-powdered retort-carbon is mixed with a solution of soluble silica in any ascertained or suitable proportions, according to the degree of hardness and resistance efficiency desired. For instance, equal parts of soluble silica and water may be taken to form the levigating solution, which is mixed with the carbon in the proportions of one ounce of the said solution to every two ounces of the carbon. The paste thus produced is subsequently dried and afterward subjected to a very high temperature, with the result that by the action of the heat upon the agglutinate the mass hardens, and if the paste should be heated in contact with a body containing silica, such as an unglazed tile, it will adhere closely to the latter and does not exhibit the least tendency to disrupt either during the heating process or afterward when subjected to high temperatures. It has been proved by test and experiment that the electrical resistance of this siliciously-assembled carbon considerably exceeds that of hard arc carbon, a rod of which twelve inches in length and three-eighths of an inch in diameter is found to be practically about one ohm, whereas the resistance of a similar rod of the reassembled and prepared carbon is approximately 4.2 ohms, and the degree of hardness which it ultimately attains when thoroughly set or fixed is sufficient for all practical purposes, inasmuch that glass-paper has only a slight effect upon it and a smooth file is required to abrade the surface to any material degree. Further, it is not affected by any variations of temperature nor by moisture, as the drying of the paste has the effect of settling and hardening the mass in a manner similar to that in which hydraulic cements are set and hardened by the action of water. The further hardening of the set mass when required for special purposes is effected by immersing the carbon, together with its support, in a solution of $CO_2$ or other weak acid.

In making up radiator resistance units or elements in which the prepared carbon forms the resistance material each unit is made up of a pair of vitrified stoneware or fire-clay tiles or other suitable refractory insulating material adapted to be bolted together at the corners, and one of them is provided upon the inner side with a shallow sinking of suitable depth to contain the carbon paste, while the inner face of the other tile is plain or flat.

The sinking or recess in the one tile carries the paste, and the charged tile is heated in a drying-oven to a moderate temperature to dry the mixture. The dried paste in this condition is amenable to the action of glass-paper and so that current adjustment can be made by passing a current of known voltage through the mass and removing the material at the surface until a low-reading ammeter indicates that the current capacity has been reduced to the required standard. After adjustment the element is returned to the oven and strongly heated to about 350° to 400° Fahrenheit for a suitable period, when the carbon is hardened and caused to adhere closely to the tile, which renders the use of any mechanical fixings, cements, or the like unnecessary, and great pressure does not need to be exerted in bolting together the two tiles to inclose the carbon and complete the element, while the connection of the conductors with the insulating material may be effected by clamping thin copper strips between the tiles, so that their inner ends will touch the carbon.

In cases where the element requires to be subjected to the action of $CO_2$ solution or other weak acid to obtain extreme hardness the tile and hardened and self-attached block of siliciously-assembled carbon are immersed together into a bath of the acid and allowed to remain until the resultant effervescence ceases.

The invention is not limited to the one particular method herein described of making up the reassembled carbon into resistance elements, as the agglutinated carbon may be applied, either prior to or after heating, in a variety of ways, according to the particular nature or purpose for which it is to be used; neither is it necessary in some cases to use a second tile as a cover to the tile carrying carbon.

Having fully described my invention, what I desire to claim and secure by Letters Patent is—

1. The herein-described process of preparing carbon for electrical resistances, &c., consisting in mixing powdered carbon with an alkaline silicious agglutinate, and setting and hardening the resultant paste by subjecting the same to a high temperature.

2. The herein-described process of preparing carbon for electrical resistances, &c., consisting in mixing powdered carbon with an alkaline silicious agglutinate, setting and hardening the resultant paste by subjecting the same to a high temperature, and increasing the hardness by submitting the product to the action of a weak acid solution.

3. The herein-described process for forming electrical resistance elements for radiators and other uses, consisting in producing a paste from powdered carbon and a silicious agglutinate, applying this paste to tiles of fire-clay, stoneware or other refractory insulating material containing silica, and collectively heating the fire-clay, stoneware or other refractory material and paste applied thereto.

4. The herein-described electrical resistance material consisting of hardened powdered carbon and an alkaline silicious agglutinate.

In testimony whereof I have hereunto set my hand in presence of two subscribing witnesses.

EDWARD GEORGE RIVERS.

Witnesses:
ARTHUR DATOR,
H. D. JAMESON